United States Patent
Aoyagi

(10) Patent No.: US 8,130,844 B2
(45) Date of Patent: Mar. 6, 2012

(54) APPARATUS AND METHOD FOR SYNCHRONIZED PLAYBACK

(75) Inventor: Shigenori Aoyagi, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 1183 days.

(21) Appl. No.: 11/435,776

(22) Filed: May 18, 2006

(65) Prior Publication Data

US 2006/0274827 A1   Dec. 7, 2006

(30) Foreign Application Priority Data

Jun. 2, 2005   (JP) ................................ 2005-163147

(51) Int. Cl.
  *H04N 7/12*   (2006.01)
  *H04N 5/932*  (2006.01)
(52) U.S. Cl. ................................. 375/240.28; 386/220
(58) Field of Classification Search ............. 375/240.28; 386/220
  See application file for complete search history.

(56) References Cited

U.S. PATENT DOCUMENTS

| 6,744,815 | B1  | 6/2004  | Sackstein et al. |
| 7,268,826 | B2* | 9/2007  | Lundblad et al. ............. 348/515 |
| 2002/0191107 | A1 | 12/2002 | Hu et al. |
| 2003/0021298 | A1* | 1/2003 | Murakami et al. ............ 370/535 |

FOREIGN PATENT DOCUMENTS

| EP | 0 907 177 P2 | 4/1999 |
| JP | 6-275053 | 9/1994 |
| JP | 2002-262214 | 9/2002 |
| JP | 2003-284066 | 10/2003 |
| JP | 2004-88366 A | 3/2004 |
| JP | 2004-253022 | 9/2004 |

OTHER PUBLICATIONS

J. Y. Hui et al., "Client-Server Synchronization and Buffering for Variable Rate Multimedia Retrievals," IEEE Journal on Selected Areas in Communication, vol. 14:1, Jan. 1996, pp. 226-347.

* cited by examiner

*Primary Examiner* — Jay Patel
*Assistant Examiner* — Richard Torrente
(74) *Attorney, Agent, or Firm* — Foley & Lardner LLP

(57) ABSTRACT

A synchronized playback apparatus for outputting a video and audio signal from superimposed video and audio data respectively that includes a video buffer for temporarily holding video data separated by the data separation unit, an audio buffer for temporarily holding audio data separated by the data separation unit, a video decoder for decoding video data temporarily held in the video buffer and outputting a video signal, an audio decoder for decoding audio data temporarily held in the audio buffer and outputting an audio signal, and a synchronization control unit for determining a timing for an audio signal to be outputted by the audio decoder according to an amount of video data accumulated in the video buffer and a bit rate for video data decoded by the video decoder.

12 Claims, 4 Drawing Sheets

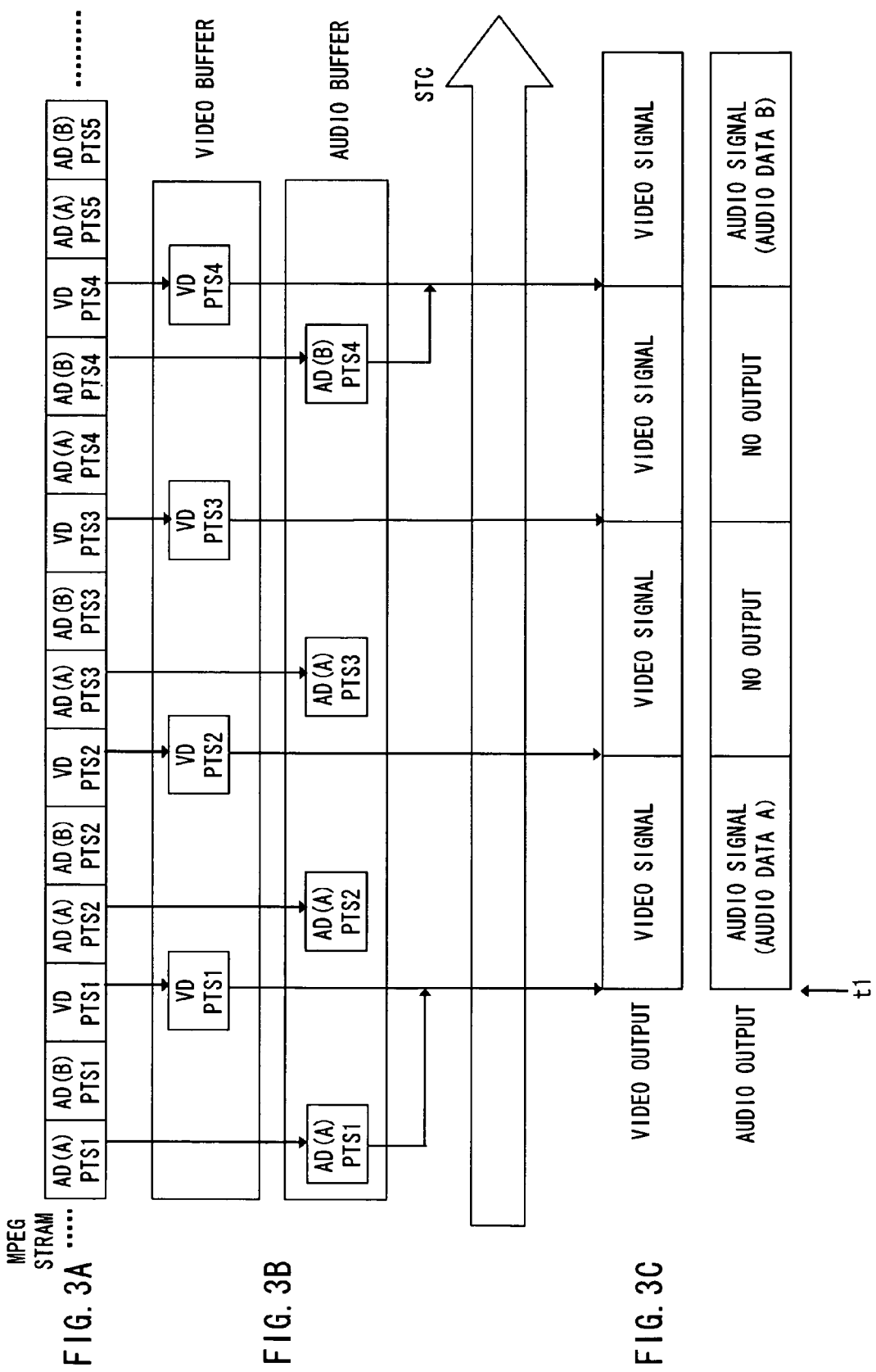

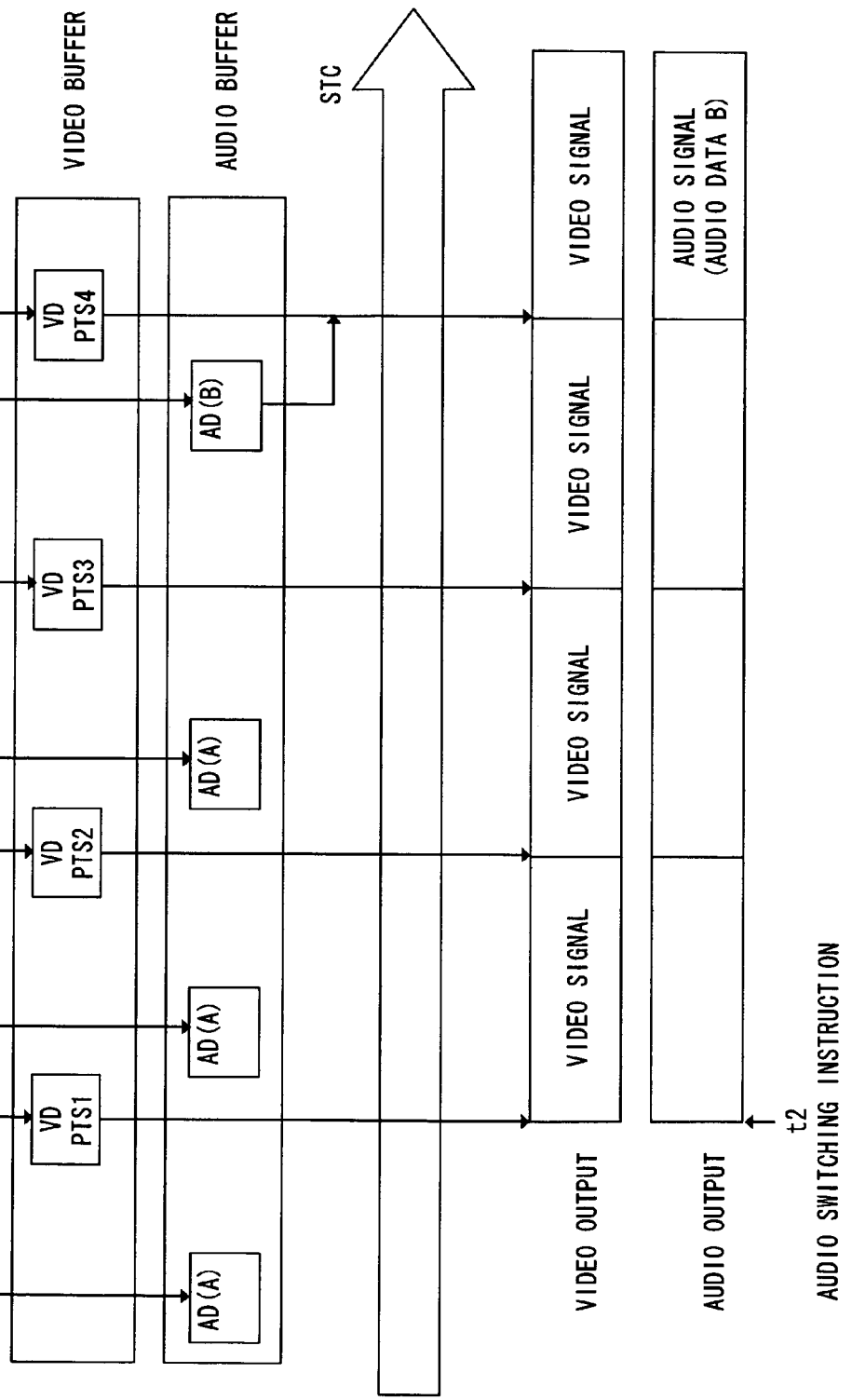

APPARATUS AND METHOD FOR SYNCHRONIZED PLAYBACK

BACKGROUND OF THE INVENTION

1. Field of the Invention

The present invention relates to an apparatus and method for synchronized playback of video and audio data, and particularly to a synchronized playback of audio and video data for data having a plurality of audio data.

2. Description of the Related Art

As an international standard for encoding video data and audio data and multiplexing of those data, MPEG (Moving Picture Expert Group) standard is widely known. Information called PTS (Presentation Time Stamp) is included in video/audio data recorded in accordance with the MPEG standard. PTS contains information for synchronizing the time. For example in a stream having a plurality of audio data corresponding to video data, PTS enables to continue playing video while switching only the audio.

Along with an increasing usage of a playback apparatus for video/audio recorded in MPEG format, software that uses a device or a personal computer for recording video/audio in MPEG format are becoming widely used. There are some software that produce MPEG streams without PTS as they understand the MPEG standard in their own ways. With such a MPEG stream without PTS, video and audio must both be stopped before switching the audio so that the video and audio can be synchronized to resume playing the MPEG stream.

A technique for synchronizing in such a MPEG stream is disclosed in Japanese Unexamined Patent Publication No. 6-275053 (Yamamoto). The technique disclosed by Yamamoto assumes that audio data is always inserted at a constant interval. Virtual PTS for audio data is calculated under this assumption using a characteristic of CD, which is a recording medium. Further, video and audio data are synchronized by synchronizing the virtual PTS with PTS associated with the video data. However the present invention has recognized that the technique disclosed by Yamamoto requires to use a characteristic of recording media in order to obtain a virtual PTS for audio data.

SUMMARY OF THE INVENTION

According to an aspect of the present invention, there is provided a synchronized playback apparatus for outputting a video and audio signal from superimposed video and audio data respectively that includes a data separation unit for separating video and audio data, a video buffer for temporarily holding video data that is separated by the data separation unit, an audio buffer for temporarily holding audio data that is separated by the data separation unit, a video decoder for decoding video data temporarily held in the video buffer and outputting a video signal, an audio decoder for decoding audio data temporarily held in the audio buffer and outputting an audio signal, a video buffer accumulated amount retrieval unit for retrieving an amount of video data accumulated in the video buffer and outputting an accumulated amount signal, a bit rate retrieval unit for retrieving a bit rate of video data that is decoded by the video decoder and outputting a bit rate signal, and a synchronization control unit for determining a timing of an audio signal to be outputted by the audio decoder based on the accumulated amount signal and the bit rate signal.

According to another aspect of the present invention, there is provided a synchronized playback method for playing a video and audio signal from superimposed video and audio data respectively that includes separating video and audio data, temporarily holding video data separated by a data separation unit, temporarily holding audio data separated by the data separation unit, retrieving an amount of video data temporarily held, retrieving a bit rate for decoding video data, and determining a timing to output an audio signal based on the amount of temporarily held video data amount and the bit rate.

The apparatus and method for playback as described in the foregoing allows to synchronize video and audio to play a stream even in a MPEG stream where PTS is not included in audio data, regardless of types of recording media.

BRIEF DESCRIPTION OF THE DRAWINGS

The above and other objects, advantages and features of the present invention will be more apparent from the following description taken in conjunction with the accompanying drawings, in which:

FIGS. 3A to 3C are views showing an input stream, an output audio signal, and an output signal respectively according to an embodiment of the present invention; and FIGS. 4A to 4C are views showing an input stream, an output audio signal, and an output signal respectively according to an embodiment of the present invention.

PREFERRED EMBODIMENT OF THE INVENTION

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Figure 1:
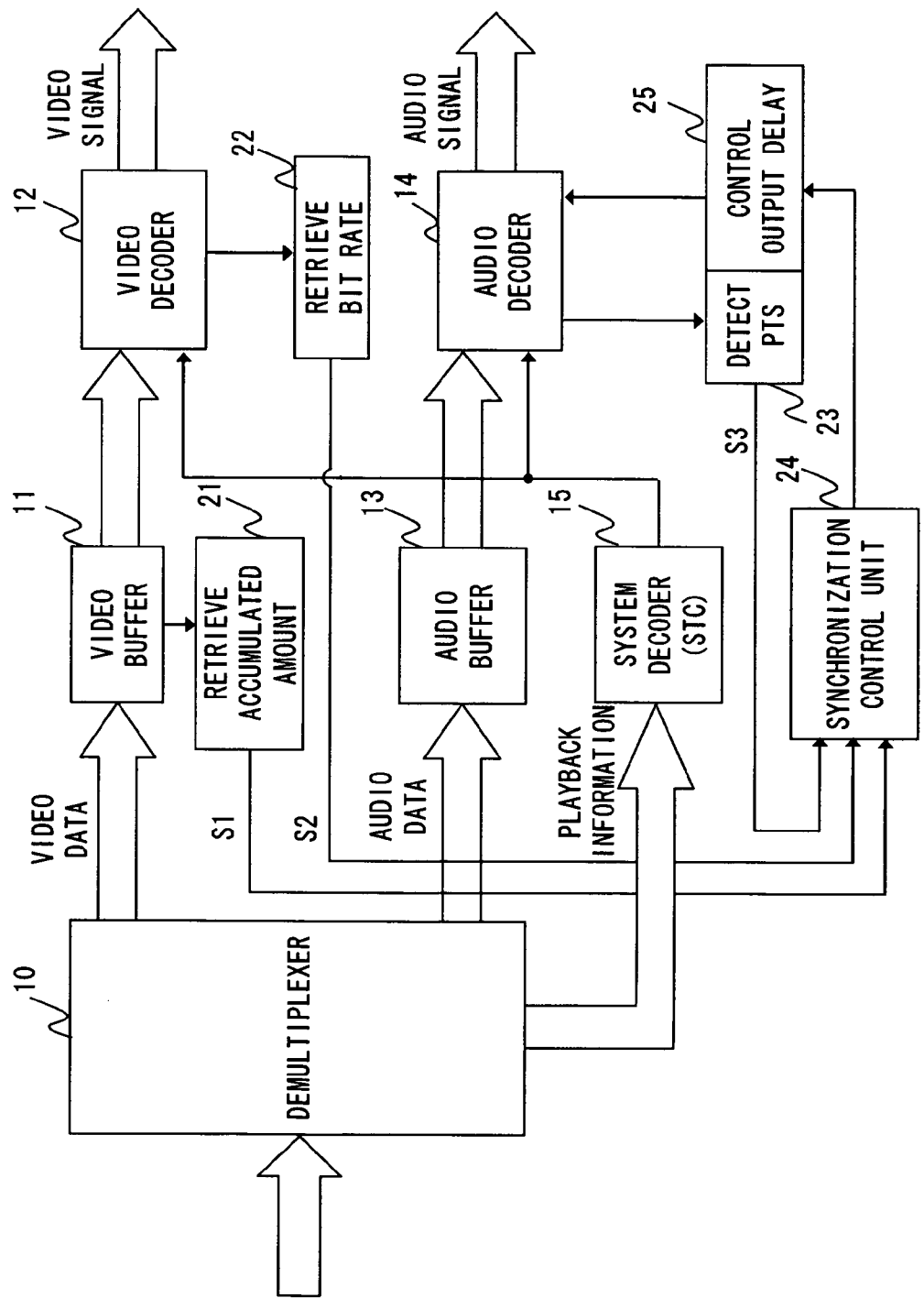
FIG. 1 is a block diagram showing a synchronized playback apparatus according to an embodiment of the present invention.

FIG. 1 is a block diagram showing a synchronized playback apparatus according to an embodiment of the present invention. A synchronized playback apparatus of this embodiment receives a stream that is compliant with a standard such as MPEG2 and synchronizes a video signal with an audio signal to play the stream.

The synchronized playback apparatus shown in FIG. 1 includes a demultiplexer 10, a video buffer 11, a video decoder 12, an audio buffer 13, an audio decoder 14, and a system decoder 15, as a basic configuration of a playback apparatus. The synchronized playback apparatus of this embodiment further includes a video buffer accumulated amount retrieval unit 21, a bit rate retrieval unit 22, a PTS detection unit 23, a synchronization control unit 24, and an output delay control unit 25.

The demultiplexer 10 is a separation device for separating a MPEG stream to be inputted, and outputting video data, audio data, and playback information.

The video buffer 11 temporarily holds video data outputted from the demultiplexer. In this embodiment, the video buffer 11 is FIFO (First In First Out).

The video decoder 12 decodes video data outputted from the video buffer 11 and outputs a video signal.

The audio buffer 13 temporarily holds audio data outputted from the demultiplexer. In this embodiment, the audio buffer 13 is FIFO (First In First Out).

The audio decoder 14 decodes audio data outputted from the audio buffer 13 and outputs an audio signal.

In the system decoder 15, STC (System Time Clock) for controlling timing is generated from playback information outputted from the demultiplexer 10. STC controls timing to output video and audio data.

The video buffer accumulated amount retrieval unit 21 retrieves an accumulated amount of video data in the video buffer 11 and outputs an accumulated amount signal S1 corresponding to the accumulated amount.

The bit rate retrieval unit 22 obtains a bit rate for the video decoder 12 to output a video signal, and outputs a bit rate signal S2.

The PTS detection unit 23 evaluates whether PTS can be detected from audio data inputted to the audio decoder 14 through the audio buffer 13, and outputs a PTS detection signal S3.

The synchronization control unit 24 determines a timing to output an audio signal in order to synchronize an audio signal with a video signal based on the accumulated amount signal S1, the bit rate signal S2, and the PTS detection signal S3.

The output delay control unit 25 controls delay of an audio signal outputted by the audio decoder 14 according to an output timing for the audio signal determined by the synchronization control unit 24.

Figure 2:
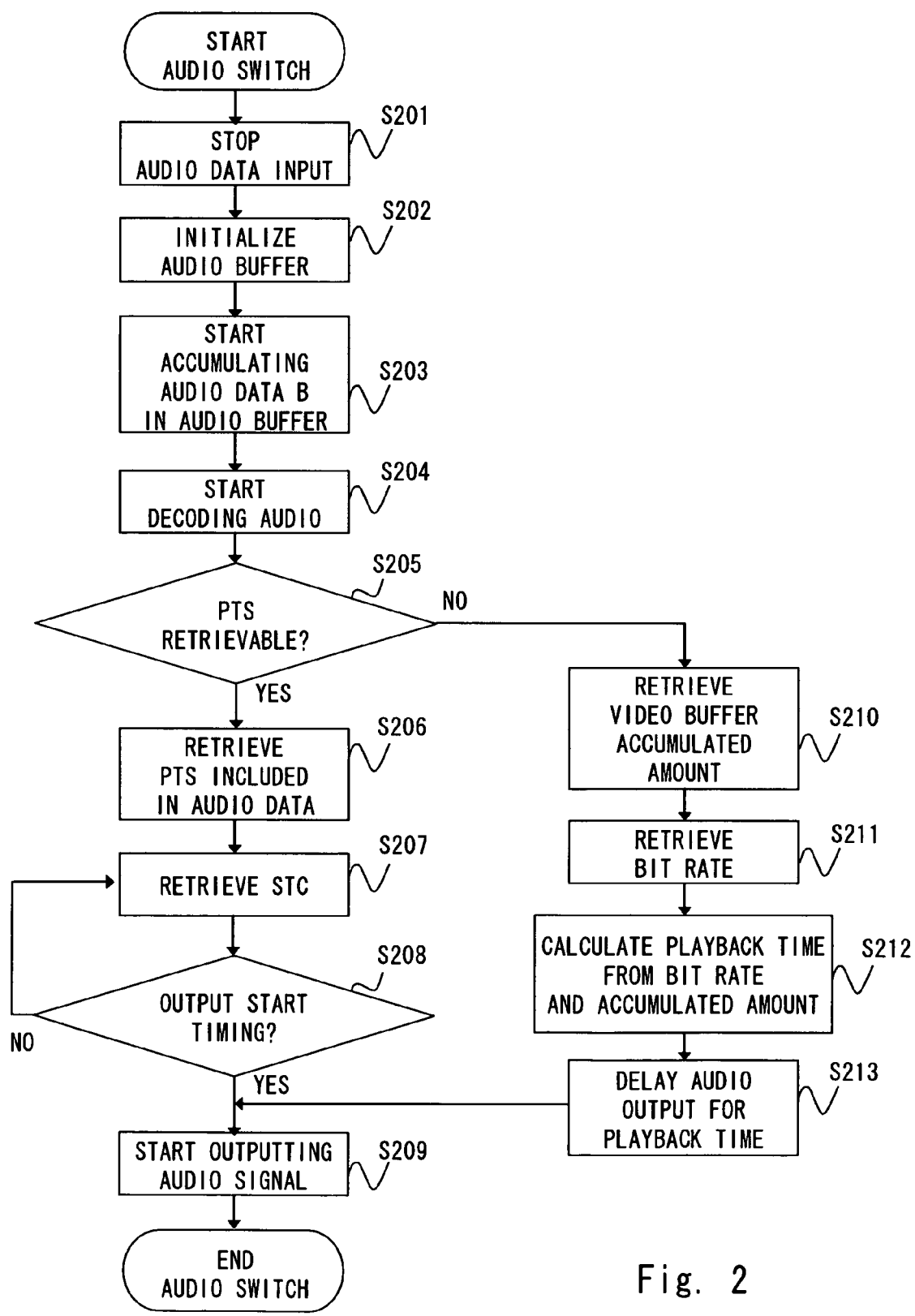
FIG. 2 is a flow chart showing an operation according to an embodiment of the present invention.

An operation of the synchronized playback apparatus with a configuration as stated above is described hereinafter in detail. Under a situation where a plurality of audio data such as bilingual audio are inputted, a case of switching audio is described as an example. FIG. 2 is a flow chart of such an audio switching in a case where audio data A and audio data B are inputted, for instance.

When directed to switch audio, in a step S201, input of audio data is stopped and an audio output based on the audio data A is stopped. Then in a step S202, the audio buffer 13 is initialized. At this time, the audio data A held in the audio buffer 13 is discarded.

In a step S203, audio data to be inputted is switched to the audio data B and the audio data B is accumulated in the audio buffer 13. In a step S204, the audio decoder 14 starts decoding the audio data B that is accumulated in the audio buffer 13.

In a step S205, a decoded audio data is evaluated whether it includes PTS or not. The evaluation is conducted by the PTS detection unit 23. If PTS is included in the audio data, the PTS detection signal S3 outputted by the PTS detection unit 23 indicates that PTS is included. If the PTS detection signal S3 indicates that PTS is included, the synchronized playback apparatus operates as follows.

In a step S206, the audio decoder 14 retrieves PTS included in the audio data B. The audio decoder 14 retrieves STC from the system decoder 15 (Step S207). The audio decoder 14 compares the PTS retrieved from the audio data B with the STC retrieved from the system decoder 15 (step S208), and starts outputting audio data in accordance with output timings of the audio data.

In the step S205, if PTS is not included in the audio data of a MPEG stream to be inputted, the PTS detection unit 23 detects that PTS is not included and outputs a PTS detection signal S3 indicating that PTS is not included. The synchronized playback apparatus of this embodiment operates as follows according to the PTS detection signal S3.

In a step S210, the video buffer accumulated amount retrieval unit 21 retrieves an amount of video data accumulated in the video buffer 11. The bit rate retrieval unit 22 retrieves a bit rate for a video signal outputted by the video decoder 12 (step S221).

In a step S212, a playback time for data accumulated in the video buffer 11 is calculated from the following formula.

An amount of data accumulated in the video buffer 11 (bit)/bit rate (bit/s)

A playback time for video data accumulated in the video buffer 11 can be calculated from the above formula.

In a step S213, a delay time for the switched audio data B is determined from the above formula. The delay time is a time to delay decoding of the audio data B so as to match timings of audio data that should be outputted at the same time with video data in a MPEG stream. To be specific, if starting to decode and output audio based on the audio data B at a moment when switching audio data from the audio data A to the audio data B, output timings of video and audio could differ from each other in a case unplayed video data are accumulated in a video buffer. This embodiment thus makes it possible to calculate time to delay decoding the audio data B so that the time for outputting video and audio output can be matched. Based on the playback time for video, the synchronization control unit 24 specifies a delay time from the point when playback of the aborted audio data A is stopped to the point when starting to play subsequent audio data. The output delay control unit 25 outputs an audio signal with the delay time specified by the synchronization control unit 24, and the audio switching is completed.

An operation of this embodiment is described hereinafter in detail with reference to FIGS. 3A to 4C. FIGS. 3A to 3C are a pattern diagram showing a synchronized playback when PTS is included in audio data. FIG. 3A shows a MPEG stream to be inputted. FIG. 3B shows data accumulated in the video buffer 11 and audio buffer 13. FIG. 3C shows video and audio signals to be outputted.

Referring to FIG. 3C, at a time t1, suppose that video data (VD) and audio data A (AD (A)) are already accumulated up to the part indicated with PTS3 in the video buffer 11 and the audio buffer 13. If audio is directed to be switched at this point, audio data is accumulated from the part corresponding to PTS4. Video data in the video buffer 11 are not especially influenced and consecutively outputted as video signals. With the audio switching, the audio data A of PTS2 and PTS3 are no longer needed. Thus the audio data A of PTS2 and PTS3 will not be outputted as audio. At a timing when STC corresponds to PTS4, video data corresponding to PTS4 and the audio data B corresponding to PTS4 are outputted as video and audio signals respectively. Video and audio are thus synchronized to be played and the audio switching is completed.

FIGS. 4A to 4C are a view explaining an audio switch when PTS is not included in audio data. FIG. 4A shows a MPEG stream to be inputted. FIG. 4B shows data accumulated in the video buffer 11 and audio buffer 13. FIG. 4C shows video and audio signals to be outputted. In this embodiment, a method of switching an audio signal to a signal corresponding to the audio data B and determining a timing for outputting the signal differs from a case when PTS is included.

Referring to FIG. 4C, at a time t2, suppose that video data (VD) and audio data A (AD (A)) are already accumulated up to the part indicated with PTS3 in the video buffer 11 and the audio buffer 13.

If audio is directed to be switched at a timing of t2, data corresponding to the audio data B is accumulated after the audio data A being accumulated up to that time in the FIFO style audio buffer 13. However in a case where PTS is not included, a timing to output audio corresponding to the audio data B is unknown, thus the following control is conducted.

If an audio switching signal is inputted from outside, data accumulated in the audio buffer 13 is no longer needed at that point, thus data up until a moment when an audio switching signal is inputted are not outputted as audio.

After that, data corresponding to the audio data B is inputted to the audio buffer 13 according to the audio switching signal. When data corresponding to the audio data B is inputted to the audio buffer 13, an accumulated amount in the video buffer 11 by the time when data corresponding to the audio data B is inputted and a bit rate are inputted to the synchronization control unit 24 by the above-mentioned video buffer accumulated amount retrieval unit 21 and the bit rate retrieval unit 22. The accumulated amount in the video buffer 11 here refers to an amount of video signals accumulated in the video buffer and not yet outputted by the time when an output of the audio data A is stopped and switched to the audio data B. To be specific in FIG. 4, it is equivalent to an amount obtained by calculating VD(PTS2)+VD(PTS3). The synchronization control unit 24 calculates an amount delay for an audio output from the above formula using an accumulated amount signal S1 and a bit rate signal S2 at this time. The output delay control unit 25 starts decoding and outputting audio for data corresponding to the audio data B according to the delay time determined by the synchronization control unit 24.

Controlling as above enables to synchronize a video signal and an audio signal. Further, video and audio can be synchronized regardless of types of media a MPEG stream is recorded, because synchronization is conducted according to an accumulated amount in a video buffer by the time audio is switched and a decoding timing, and not by allocating virtual PTS that is dependent on a recording medium.

Though an audio switch is described in detail as an example, the present invention can be applied to cases including a switch of playback speed.

It is apparent that the present invention is not limited to the above embodiment and it may be modified and changed without departing from the scope and spirit of the invention.

What is claimed is:

1. A synchronized playback apparatus for outputting a video and audio signal from superimposed video and audio data respectively comprising:
    a data separation unit for separating the video data and the audio data;
    a video buffer for temporarily holding video data separated by the data separation unit;
    an audio buffer for temporarily holding audio data separated by the data separation unit;
    a video decoder for decoding video data temporarily held in the video buffer and outputting a video signal;
    an audio decoder for decoding audio data temporarily held in the audio buffer and outputting an audio signal; and
    a synchronization control unit for determining a timing for an audio signal to be outputted by the audio decoder according to an amount of video data accumulated in the video buffer and a bit rate for video data decoded by the video decoder,
        wherein the synchronization control unit is configured to determine the timing for the audio signal according to the amount of video accumulated in the video buffer and the bit rate in response to a determination that a presentation time stamp (PTS) is not included in the audio signal.

2. The synchronized playback apparatus according to claim 1, wherein the synchronization control unit calculates an amount of delay for the audio signal according to the amount of video data accumulated in the video buffer and the bit rate.

3. The synchronized playback apparatus according to claim 2, further comprising an output delay control unit for delaying an output of the audio signal according to the amount of delay calculated by the synchronization control unit.

4. The synchronized playback apparatus according to claim 2, wherein the amount of delay is determined by dividing the amount of video data accumulated in the video buffer by the bit rate for video data decoded by the video decoder.

5. The synchronized playback apparatus according to claim 2, wherein the synchronization control unit determines a timing for resynchronizing an audio signal outputted by the audio decoder.

6. The synchronized playback apparatus according to claim 2, wherein the synchronization control unit suspends an output of an audio signal based on first audio data outputted by the audio decoder and determines a timing to output an audio signal based on second audio data.

7. The synchronized playback apparatus according to claim 1, wherein the synchronization control unit determines a timing to resynchronize an audio signal outputted by the audio decoder.

8. The synchronized playback apparatus according to claim 1, wherein the synchronization control unit suspends an output of an audio signal based on first audio data outputted by the audio decoder and determines a timing to output an audio signal based on second audio data.

9. The synchronized playback apparatus according to claim 1, further comprising:
    a video buffer accumulated amount retrieval unit for retrieving an amount of video data accumulated in the video buffer and outputting an accumulated amount signal; and
    a bit rate retrieval unit for retrieving a bit rate for video data decoded by the video decoder and outputting a bit rate signal;
    wherein the synchronization control unit determines a timing for an audio signal to be outputted by the audio decoder according to the accumulated amount signal and the bit rate signal.

10. A synchronized playback method for playing video and audio signal from superimposed video and audio data respectively comprising:
    separating the video and audio data via a data separation unit of a synchronized playback apparatus;
    temporarily holding the separated video data at a video buffer of the synchronized playback apparatus;
    temporarily holding the separated audio data at an audio buffer of the synchronized playback apparatus;
    retrieving an amount of video data temporarily held;
    retrieving a bit rate for decoding the video data; and
    determining a timing to decode and output an audio signal by decoding audio data according to the amount of video data temporarily held and the bit rate,
        wherein the timing to decode and output the audio signal based on the amount of video data temporarily held and the bit rate is determined in response to a determination that a presentation time stamp (PTS) is not included in the audio signal.

11. The synchronized playback method according to claim 10, wherein the timing to output the audio signal is calculated with a delay time for outputting the audio signal according to the amount of video data temporarily held and the bit rate.

12. The synchronized playback method according to claim 11, wherein the calculation is conducted by dividing the amount of video data temporarily held by the bit rate.

* * * * *